May 24, 1960 R. A. PETERSON 2,937,915
RECORDING SYSTEM
Filed Dec. 19, 1955 3 Sheets-Sheet 1

RAYMOND A. PETERSON,
INVENTOR.

BY
ATTORNEY.

May 24, 1960
R. A. PETERSON
2,937,915
RECORDING SYSTEM
Filed Dec. 19, 1955
3 Sheets-Sheet 2
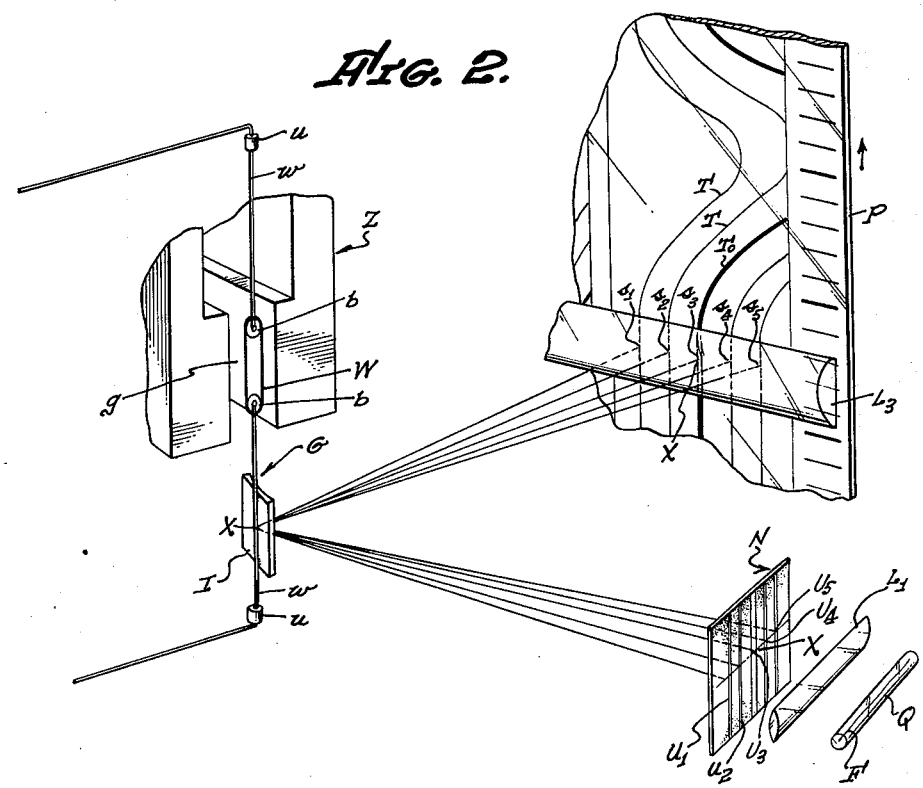
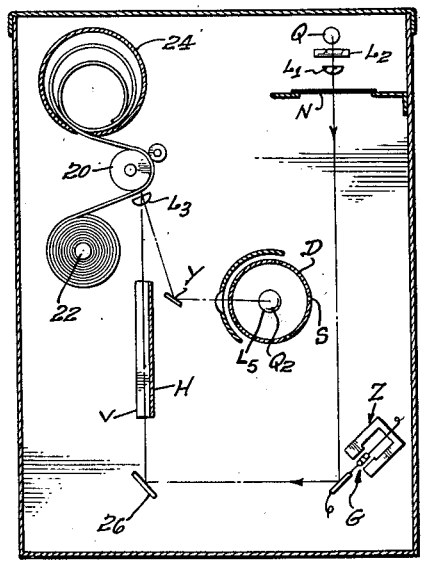
Raymond A. Peterson,
INVENTOR.
BY
ATTORNEY.

May 24, 1960  R. A. PETERSON  2,937,915
RECORDING SYSTEM
Filed Dec. 19, 1955  3 Sheets—Sheet 3
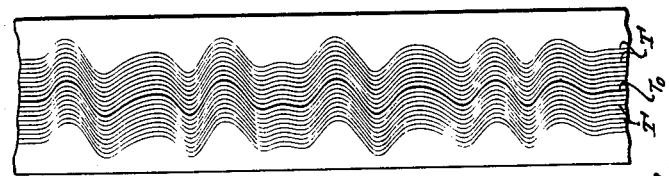
Fig. 5.
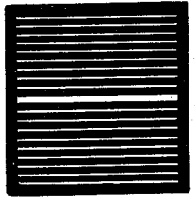
Fig. 4a.
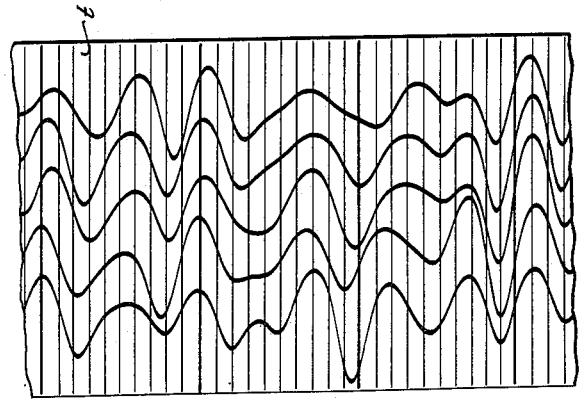
Fig. 6.
Fig. 4b.
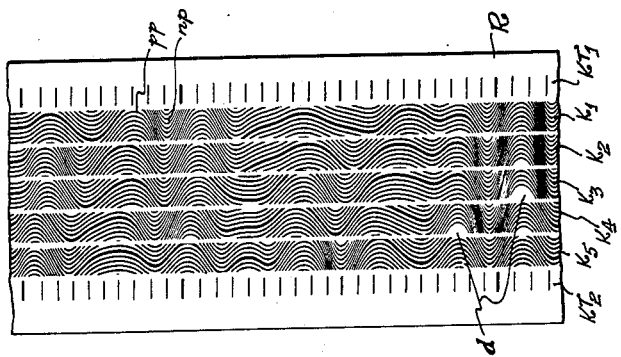
Fig. 7.
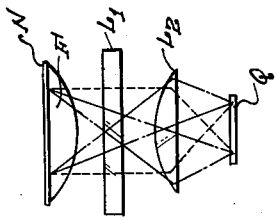
Fig. 3.
RAYMOND A. PETERSON,
INVENTOR.
BY
ATTORNEY.

United States Patent Office 2,937,915
Patented May 24, 1960

2,937,915
RECORDING SYSTEM

Raymond A. Peterson, Altadena, Calif., assignor to United Geophysical Corporation, Pasadena, Calif., a corporation of California Filed Dec. 19, 1955, Ser. No. 554,047

7 Claims. (Cl. 346—109)

This invention relates to improvements in recording galvanometers, or oscillographs, and particularly to improvements in multiple-galvanometers or oscillographs of the type employed in seismic prospecting and other fields in which a plurality of traces representing closely related phenomenon are recorded in side-by-side relationship on an elongated record strip.

Since the invention is particularly useful in reflection seismic prospecting the application of the invention to reflection seismic prospecting will be particularly described. However, it will be understood that the invention is also applicable to refraction seismic prospecting methods and to other systems in which records are made of a plurality of related measurements.

In reflection seismic prospecting, seismic waves are usually generated at a shotpoint near the surface of the earth by detonating an explosive charge located in a shallow borehole. The waves so generated are detected at a series of spaced seismometers located at the surface of the earth, after the waves have travelled downwardly to various formations and have been reflected upwardly from the formations. In this process, a short wave train or wavelet created at the time that the explosive charge is detonated, is reflected by the various subsurface formations encountered as the wave travels downwardly. As a result, long trains of seismic waves are returned to the various seismometers at the surface of the earth. The trains of waves usually bear a marked similarity but yet differ somewhat because of variations in subsurface formations from one horizontal position to another and because of differences existing between the paths over which the wave trains travel to the various seismometers and for other reasons.

The various trains of seismic waves reaching the different seismometers are converted by the seismometers into corresponding electrical wave trains. These electrical wave trains are then amplified electrically and the amplified wave trains are recorded by means of a multiple-galvanometer oscillograph. In this recording process, each electrical wave train is recorded as a separate trace and all of the wave trains are recorded in side-by-side relation as a multiple trace record.

Very commonly, the excursions of neighboring traces overlap, and obscure each other. For this reason, when an attempt is made to measure the relative times of arrival of seismic waves at different seismometers, it is difficult to identify related events on different traces and to accurately measure their relative times of occurrence.

Accordingly, one object of this invention is to provide an improved multiple-element oscillograph in which each electrical wave train is recorded as a plurality of identical oscillograph traces, within the limits of adjacent non-overlapping tracks of a record strip so that overlapping of traces is avoided but without loss of information regarding the times of occurrence of various recorded events.

In an article entitled "Better Seismic-Reflection Computations," published in the December 20, 1954 issue of the Oil and Gas Journal, pp. 146 ff. Mr. John W. Flude has described an improved method of plotting reflection profile sections. This process, which is ascribed to Mr. V. T. Reynolds, involves re-recording seismograph traces in such a way as to correct for normal moveout, weathering corrections, seismometer elevations, and horizontal variations in vertical velocity. In the Reynolds system, the usual paper seismogram is first reprinted as a transparency and then each trace of the reprint seismogram is printed by projection onto a separate recording sheet, such as a large sheet of sensitized paper, in such a way as to incorporate corrections for differences in elevation, for differences in weathering corrections, and for differences in step-out, making use of the velocity data that represents the manner in which seismic wave velocity varies as a function of time of travel from the shotpoint to formations at different depths and then to the seismometers. Traces from other seismograms are similarly re-recorded on the same large sheet. By recording traces from different seismograms in side-by-side relationship and in lateral positions corresponding to the horizontal positions of various parts of the subsurface from which waves on the seismograms were reflected, a vertical section or profile of subsurface formations is produced. In the making of such plot it is often satisfactory to neglect the dip of the strata even though the existence of dip becomes self evident on the completed profile section.

Another object of the invention is to provide an improved method of producing transparent seismograms displaying bright, or transparent, traces against an opaque background.

Ordinary seismograms cannot very well be employed to produce profiles with a Reynolds plotter because of trace overlapping. For this reason, Reynolds has employed a system for chopping the traces at their extremities so that adjacent traces will not overlap and hence obscure each other. This process, however, is not entirely satisfactory, since it results in loss of considerable information.

Accordingly, another object of this invention is to provide an improved multiple-galvanometer oscillograph for producing multiple-track records of a type that are adapted for use in a Reynolds plotter without however, discarding important information represented by different phases of the ordinary seismic wave trace.

The foregoing and other objects of this invention, together with various advantages thereof, will become apparent from the following description taken in connection with the accompanying drawings, wherein:

Fig. 2 is a schematic diagram employed in explaining certain optical properties of the system;

Fig. 3 is a schematic diagram of an alternative form of source unit;

Figs. 4a and 4b are diagrams of alternative forms of screens that may be employed as part of the source unit;

Fig. 5 represents a multiple trace oscillogram produced by a single-element oscillograph embodying the present invention;

Fig. 6 represents a multiple-trace seismogram produced by the usual type of multiple-element oscillograph;

Fig. 7 is a fragmentary view of a multiple-track multiple-trace seismogram produced in accordance with the present invention; and Fig. 8 is a schematic cross-sectional diagram of a multiple-element oscillograph embodying the invention.

Figure 1:
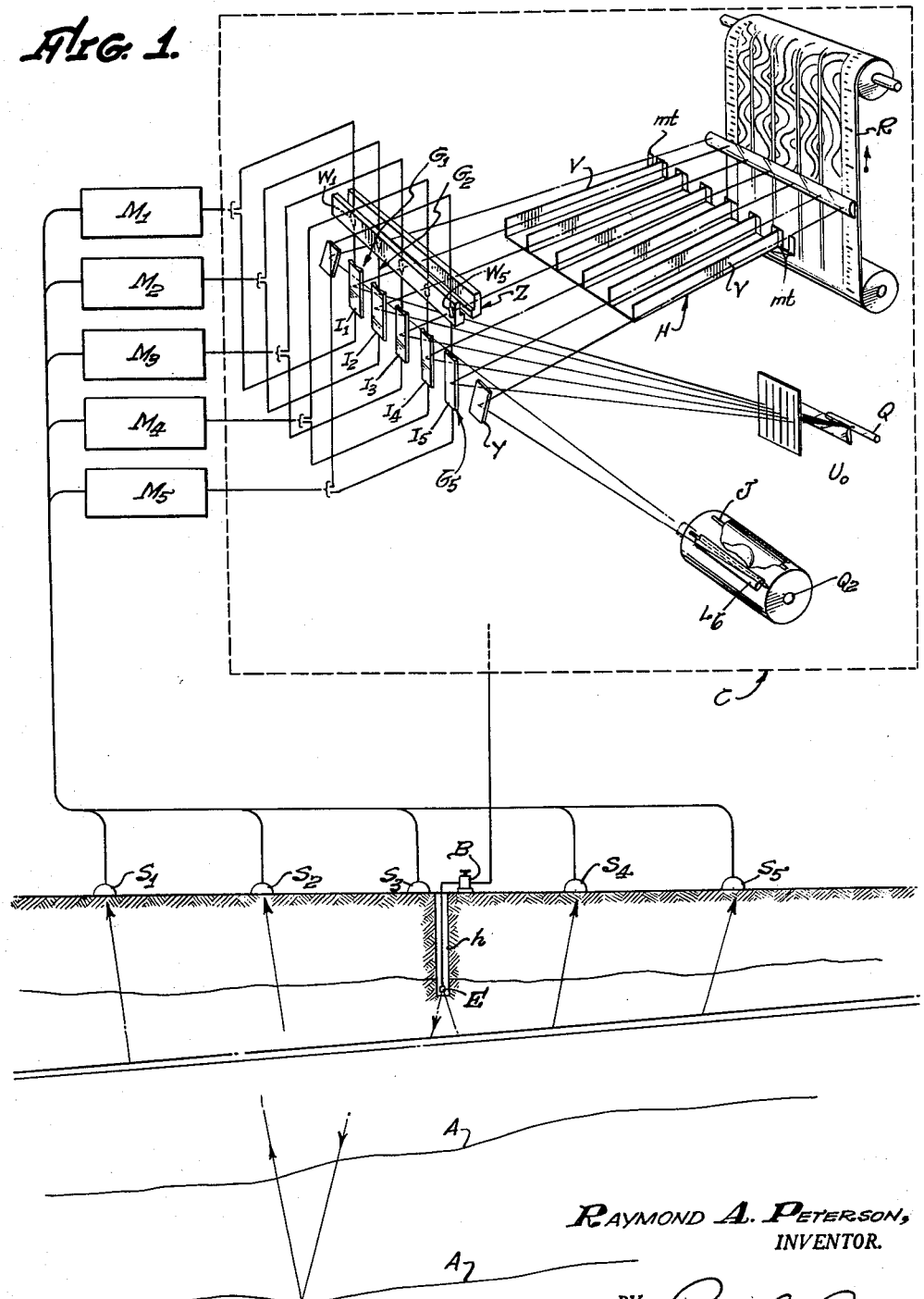
Figure 1 is a schematic diagram of a reflection seismic prospecting system employing this invention.

In accordance with this invention, duplicates of an oscillograph trace are recorded in side-by-side nested relationship on a common sheet of recording paper or film and certain duplicate traces are recorded in a distinctively different manner from others so that specific duplicate traces may be readily recognized. When applying the invention to the recording of related events by means of a multiple-galvanometer oscillograph, each galvanometer of the oscillograph is arranged to produce its own set of duplicate traces in side-by-side relationship. Furthermore, masking is provided to confine the recording of multiple traces from each recording element to a separate area or track on a common record sheet. The tracks corresponding to the various oscillograph elements lie in side-by-side relationship in order to facilitate correlation of events recorded on the separate tracks. The advantages of recording such duplicate traces can be best understood from the following description of a specific embodiment of the invention in the field of reflection seismic prospecting.

A system for recording a seismogram in accordance with this invention is shown in Fig. 1. This system includes a shothole $h$, a split spread of seismometers $S_1$, $S_2$, $S_3$, $S_4$, and $S_5$ and associated amplifying and recording equipment, including the improved oscillograph C. Though the invention is described as being applicable to a split spread of five seismometers, it will be understood that it is applicable to other types of seismometer spreads and to spreads comprising any number of seismometers such as twelve or twenty-four.

When a blaster B is manipulated, a charge of explosive E located in the shothole $h$ generates seismic waves which travel outwardly in all directions. At the time that the blaster is operated an electric signal is transmitted to the oscillograph C in order to record a "time break" by means of one of the galvanometers. Seismic waves reflected at interfaces A between strata beneath the surface of the earth are returned to the surface where they are detected by means of the seismometers $S_1$, $S_2$, $S_3$, $S_4$, and $S_5$. The seismometers are of conventional type which are adapted to convert the received seismic waves into corresponding electrical waves. Such electrical waves vary as a function of time in a manner related to that in which the velocity of the surface of the earth varies as a function of time as the seismic waves are received. The electric waves generated at the outputs of the respective seismometers differ from each other because of the fact that the seismic waves received at the various seismometers differ from each other. In any system of seismic prospecting, it is desirable to record the electrical waves in some coordinated manner so that the relative times of occurrence of the various significant related events in the reflected seismic waves may be ascertained, all as is well known in the art.

The outputs of the respective seismometers $S_1$, $S_2$, $S_3$, $S_4$, and $S_5$ are connected to the inputs of corresponding amplifiers $M_1$, $M_2$, $M_3$, $M_4$, and $M_5$. The amplified electrical waves appearing at the outputs of the respective amplifiers $M_1$, $M_2$, $M_3$, $M_4$, and $M_5$ are applied to corresponding galvanometers $G_1$, $G_2$, $G_3$, $G_4$, and $G_5$. At various points in the description that follows subscripts will be omitted when the description applies equally to similar elements. Thus, for example, when the description applies equally to any of the galvanometers $G_1$, $G_2$, $G_3$, $G_4$, or $G_5$, the symbol G will be used without any subscript.

As indicated more clearly in Fig. 2, each of the galvanometers G comprises a coil W wound on a pair of bobbins $b$ and pivotally supported torsionally by means of two collinear torsion wires $w$, $w$, the upper and lower most ends of which are rigidly supported in stationary insulating bushings $u$, $u$. A galvanometer element in the form of a cylindrical mirror I is cemented to the lower wire $w$. The windings $W_1$, $W_2$, $W_3$, $W_4$, and $W_5$ of the various galvanometers $G_1$, $G_2$, $G_3$, $G_4$, and $G_5$ are arranged in a common linear gap $g$ between the north and the south poles of a permanent magnet Z. The various mirrors $I_1$, $I_2$, $I_3$, $I_4$, and $I_5$ of the respective galvanometers $G_1$, $G_2$, $G_3$, $G_4$, and $G_5$ are arranged along a line exterior of the gap in which the coils $W_1$, $W_2$, $W_3$, $W_4$, and $W_5$ are mounted and on the opposite side of that gap from the main body of the permanent magnet E. The various wires $w$ by means of which the windings W and the mirrors I are suspended are arranged in a common plane in parallel lines that lie perpendicular to the length of the magnet gap.

In this embodiment of the invention, a multiple-element source unit SU is employed in order that each of the galvanometer mirrors I shall produce a plurality of identical or duplicate oscillograph traces. Light is projected from a plurality of sources in the source unit SU along a central optic axis X—X—X that intersects each mirror I to the plane of a sheet of photographic paper P forming a line of spots of light in the plane of the recording sheet P. The spots of light produced by each mirror I are displaced along a first or horizontal direction as the recording paper P is advanced in a second or vertical direction transverse to the optic axis. As a result, multiple-trace records are produced by each mirror in side-by-side relationship on the recording paper P.

The source unit SU, in effect, consists of a plurality of vertically extending sources of light $U_1$, $U_2$, $U_3$, $U_4$, $U_5$ arranged in side-by-side parallel relationship along a horizontal line. In the specific source unit illustrated, the sources are in the form of narrow slits formed in a screen N and a lamp Q having a horizontally disposed filament F. The filament serves as a horizontal light source which illuminates the various slits $U_1$, $U_2$, $U_3$, $U_4$, $U_5$. In the most satisfactory arrangement, a cylindrical lens $L_1$ having a horizontal axis is located between the lamp Q and the screen N. The lens $L_1$ focuses in a vertical plane an image of the filament F on the various slits $U_1$, $U_2$, $U_3$, $U_4$, $U_5$ along a common horizontal line extending through the central optic axes X—X—X. A cylindrical lens $L_2$ having a vertical axis may be employed between the lamp Q and the first cylindrical lens $L_1$ in order to focus light from the filament F at the screen N in a horizontal direction, as indicated in Fig. 3, and in this case the elongated real image at the screen acts as a real source in the plane of the screen. It is not essential that such an image be formed in a horizontal plane at the screen N, it being beneficial to employ the cylindrical lens $L_1$ to focus at the screen N in a vertical plane light emerging from the filament F, so as to effect efficient transmission of radiation to the recording paper P. Furthermore, where desired, the lenses $L_1$ and $L_2$ may be combined to form a single spherical lens. In addition, a field lens F may be mounted adjacent the screen N and on the side thereof remote from the galvanometer mirrors I. This field lens is employed to cause light passing through the slits to converge on the line of mirrors I, thus serving to increase the intensity of and the uniformity of intensity of the spots S formed by each mirror I at the plane of the recording paper P.

Each of the mirrors I is provided with a front cylindrical surface having a vertical axis for focusing in a horizontal plane each of the vertical slits $U_1$, $U_2$, $U_3$, $U_4$, $U_5$ at the plane of the recording paper P. A cylindrical lens $L_3$ having a horizontal axis is located adjacent the plane of the recording paper P. This lens has a short focal length so that it focuses in a vertical plane images of portions of the filament as seen through the respective slits $U_1$, $U_2$, $U_3$, $U_4$, $U_5$. The images formed at the photographic paper are highly minified vertically. Thus, each of the cylindrical mirrors I and the horizontal lens $L_3$ cooperate to form a plurality of images in the form of small spots $s'$, $s''$, $s'''$, $s^{iv}$, and $s^v$ at the plane of the recording paper P, each spot so formed corresponding to a different slit $U_1 \ldots U_5$.

The distance of the recording paper from each of the mirrors I is about equal to the distance of each of the mirrors from the screen N, so that a magnification of about one is produced in a horizontal plane. On the other hand, the cylindrical lens $L_3$ is very close to the recording paper, thus producing a very high degree of minification, such as a minification of 100, in a vertical plane. Thus, even if the various source elements $U_1$, $U_2$, $U_3$, $U_4$, $U_5$ are elongated in a vertical plane and radiation passes through them over an extended vertical region, each of the mirrors I and the horizontal lens $L_3$ cooperate to form images of the source units in the form of very small spots at the plane of the recording paper. Such minification occurs in a vertical plane even if the source Q is not focused in a vertical plane at the screen N. But for best results, the source Q itself or else its image in a vertical plane is focused by the lens $L_3$ in a vertical plane at the plane of the recording paper P. The spots formed by all five mirrors lie on a common horizontal line in a horiozntally elongated exposure or recording zone behind the lens $L_3$ at the plane of the recording paper P.

The sources $U_1$, $U_2$, $U_3$, $U_4$, $U_5$ are formed by individual vertical transparent slits in an opaque screen N. The screen may be in the form of a photographic plate or a sheet of photographic film which is coated with opaque portions except at the locations of the slits. The slits need not all have the same width. Furthermore, they need not be five in number. A screen N provided with nineteen slits is illustrated in Fig. 4a. In this case, the central slit is wider than the rest and the other slits are of uniform width. With this arrangement, the central spot focused on the recording paper is wider than the other spots, thus exposing the photographic paper more.

Thus, images of the respective slits U are focused as spots $s$ at the plane of the sheet of recording paper P. As each mirror I rotates about its vertical axis, the spots $s' \ldots s^v$ produced thereby at the plane of the recording paper P move horizontally in unison and by substantially equal amounts. For this reason, as a train of electrical waves applied to any galvanometer G is recorded, a pluraliy of duplicate or identical traces are recorded on the recording paper in nested side-by-side relationship.

A specimen of such a set of traces produced with a nineteen-slit screen N, is illustrated in Fig. 5. This set of traces comprises a central dark trace $T_0$ with nine light traces T disposed at uniform distances on each side of the central dark trace. Such a set of duplicate traces is produced when the screen N comprising the multiple-element source is provided with a relatively broad vertical slit at the center and nine relatively narrow slits on each side thereof, as illustrated in Fig. 4a. In a similar manner, in the examples illustrated in Figs. 1 and 2, a central dark trace $T_0$ is formed by each galvanometer mirror and two light traces T are formed on opposite sides thereof. Other arrangements of slits may be employed. In Fig. 4b, for example, a screen is illustrated which is formed by ten evenly spaced transparent lines and ten evenly spaced opaque lines arranged symmetrically about the center.

A channelizer H is arranged between the set of galvanometer mirrors I and the recording paper P in order to confine the traces produced by each mirror I to a separate track and thus prevent overlapping. The channelizer H comprises a set of vertical separator plates or wall members V that are spaced apart horizontally and are located between the parts of the central optic axes X—X—X along which the respective galvanometer mirrors I project beams toward the recording paper R. When five galvanometers are employed, six such separator plates V are used, thereby providing five channels through which the optic axes X—X—X of the corresponding mirrors M extend. Masks are arranged at the ends of the channels adjacent the recording paper R. These masks limit the area through which light from the respective mirrors may be projected onto the recording paper thus dividing the recording paper into five horizontal tracks between the sides of which the multiple traces produced by each mirror are confined. The separator plates prevent light from any mirror from passing through any mask other than the one that corresponds to it. In this way, overlapping of traces is completely avoided.

A part of a multiple track record produced in accordance with this invention is illustrated in Fig. 7. There, it will be noted that each track $K_1$, $K_2$, $K_3$, $K_4$, $K_5$ occupies a separate elongated area or strip on the recording paper R and that multiple traces produced by each mirror $M_1$, $M_2$, $M_3$, $M_4$, $M_5$ are recorded in the separate tracks. However, it will be noted that the limitation of the widths of the tracks results in truncation or clipping of many of the traces. Referring to Fig. 7, it will be noted that the central dark trace produced by each mirror is displaced from side to side in accordance with the deflection of the mirror, but that generally it can readily be identified. Furthermore, it will be noted that even though some of the traces in each track are truncated, normally a complete set of representative parts of each set of traces are recorded in each of the tracks. For this reason, it is possible to locate in each track both a positive peak $pp$ and a negative peak $np$. The location and identification of such peaks is employed in seismic prospecting to determine the relative times of arrival of seismic waves at various seismometers after the waves are reflected from common reflecting horizons beneath the surface of the earth. In Fig. 6 there is illustrated a seismogram of the ordinary type produced when each mirror produces only a single spot at the recording paper and no channelizer is employed. Here it will be noted that the excursions of the traces overlap somewhat.

The widths of the various tracks $K_1$, $K_2$, $K_3$, $K_4$, $K_5$ are all equal, and are greater than the spacing between adjacent duplicate traces to be recorded. The widths of the tracks $K_1$, $K_2$, $K_3$, $K_4$, $K_5$ are also less than the amplitude of the excursions of the spots that produce the traces. In this way, as a rule, the tracks will be occupied by a plurality of parallel evenly spaced traces. Occasionally, however, as indicated for instance, at the points $d$ of Fig. 7, the excursions of the spots will be excessive leaving some blanks spaces in the tracks. This objection may be overcome by employing a wider source unit SU.

To record the time break, an electrical signal from the blaster B is applied to one of the galvanometers G through a switching circuit (not shown).

In the ordinary multiple-element oscillograph, suitable means are provided for recording timing lines that extend across the entire width of the recording paper. Such timing lines $t$ produced by conventional methods are indicated in Fig. 6. In the present invention, only segments of timing lines are recorded, these segments being recorded in separate timing line tracks KT1 and KT2, adjacent opposite edges of the recording paper externally of but parallel to the tracks $K_1$, $K_2$, $K_3$, $K_4$, $K_5$ in which the various sets of traces are recorded. As indicated schematically in Fig. 1, such sets of timing lines may be recorded in separate channels KT1 and KT2 by projecting light that passes through slits S of a rotating drum D onto the recording paper along paths that lie outside of the channelizer H. More specifically, the rotating drum D is provided with a plurality of longitudinally extending horizontal slits that periodically cause light from a horizontal lamp $L_5$ to be projected by a horizontal cylindrical lens $L_6$ toward the mirrors Y, Y which are located outside the line of mirrors $I_1$, $I_2$, $I_3$, $I_4$, $I_5$, and which are tilted in such a way as to reflect light from the drum onto the recording paper P. This light is projected through end sections of the cylindrical lens $L_3$, so as to produce thin timing lines in the tracks KT1 and KT2 at the sides of the record paper. The mirrors Y, Y preferably have spherical surfaces focusing an image of the cylindrical lens $L_6$ at the cylindrical lens $L_3$. Suitable masks $mt$ limit the width of the beams to the timing tracks KT1 and KT2. It is to be noted that since the drum is located off the optic axis X—X—X, even though some light from the drum strikes the galvanometer mirrors $I_1$, $I_2$, $I_3$, $I_4$, $I_5$, very little of this light can be transmitted from the galvanometer mirrors to the recording paper. Other masks are provided to prevent light from travelling from the drum to the recording paper except along the paths desired. Details of such masking arrangements are not shown because they can be readily provided by a man having ordinary skill in the art.

In practice, the traces produced directly on the recording paper by projection of light from the galvanometer mirrors I and Y form latent images, which are subsequently developed by the usual chemical processes, thus producing visible traces as illustrated in Fig. 7.

A driving mechanism of any conventional form may be employed to drive the recording paper P past the images or spots formed at the plane of the recording paper by the cylindrical lens $L_3$. Such a driving mechanism may include, for example, a motor-driven roller 20 which draws paper off of a supply spool 22 forcing it past the lens $L_3$ at constant speed and into a storage can 24.

In this arrangement the source unit SU is arranged at a top corner of the housing and the magnet Z and galvanometers G at a corner directly beneath it. Light from the source unit SU is reflected by the galvanometer mirrors I to an auxiliary mirror 26 that reflects the light upwardly through the channelizer H and through the lens $L_3$ onto a part of the recording paper being carried over the roller 20. The timer is arranged at the center of the housing and the mirrors Y are mounted adjacent the channelizer so that both the timing lines and the spots formed by the galvanometer mirrors may be brought to a sharp focus on the recording paper even though the latter is curved in the recording zone. Suitable switches (not shown) are employed for driving and stopping the recording paper when desired.

By providing the drum D with ten slits, nine of which are relatively narrow and of equal width, and one of which is relatively broad, every tenth timing line on the two tracks KT1 and KT2 is made dark compared with the others as indicated in Fig. 7.

In addition to the foregoing, the oscillograph of this invention employs a suitable light-tight case for housing the galvanometers, the record drive mechanism, the source unit U, the timer drum, and the channelizer as indicated for example in Fig. 8.

When the invention is applied to the recording of only a single track by means of a single galvanometer mirror to produce a single multiple-trace record as indicated in Fig. 5, its use is advantageous because it provides an improved visual representation of variations in the phenomenon recorded. When the invention is applied to a multiple-track system in a multiple galvanometer recording oscillograph to produce a multiple track record as illustrated in Fig. 7, it has even greater advantage. In the case of a multiple track record, the correlation of corresponding events in the different tracks by visual means is greatly enhanced. This improvement in visual correlation results largely from the apparent shading which occurs in the recording process during the recording of the changes. This variation of shading along the length of track occurs because of the fact that as the light spots that produce the records are moved horizontally, a variation occurs in the spacing between the duplicate traces produced. As a result, a pattern appears on the record which facilitates identification of corresponding changes on the various tracks. Once corresponding events on the various tracks have been identified, the relative times of occurrence may be determined from the relative locations of peaks in the various tracks along the length of the record. Such locations may be measured accurately by means of the timing lines in the edge tracks KT1 and KT2, thus determining the relative times of occurrence of the related events. The manner in which such difference-time measurements may be employed in the anlysis of seismic reflection records is well known in the art and therefore is not discussed here.

In addition to the foregoing, it will be noted that if a multiple-track record of the type illustrated in Fig. 7 is employed to produce a profile section by means of a Reynolds or similar plotter, the variations in shading characteristic of the traces recorded in each track K will be reproduced fairly closely on the profile section. As a result, this grading or shading from one position to another along the Reynolds profile section will have the general appearance of stratified layers and will therefore assist the interpreter in recognizing changes in elevation, changes in thickness, faulting, and other changes occurring in the subsurface structure in the area in which the original reflection seismograph prospecting survey was made.

In the specific embodiment of the invention described above, the multiple-track seismogram of this invention has been recorded on photographic paper. In an alternative embodiment of the invention, the seismogram is recorded directly on film. This arrangement has the advantage that it provides a seismogram that may be replotted by projection methods in a Reynolds or similar plotter without the need for first reprinting the paper seismogram on transparent film. Advantageous use of this principle may also be made to produce single-trace multiple-track seismograms. To do this, it is only necessary to construct the screen N in the form of a single opaque line on a transparent plate. In that case, seismograms will be produced like those illustrated in Fig. 7 except that a single truncated transparent trace will appear in each track which is otherwise opaque.

While the invention has been described with particular reference to its application to reflection seismic prospecting, it will be understood that it may be applied to other systems in which similar related events occurring simultaneously or even at different times are recorded by means of a galvanometer. It is therefore to be understood that the invention is not limited to the specific application thereof described herein, but that it may be employed in many other ways, as will now appear to those skilled in the art. Furthermore, even though the invention has been described with reference to only one particular arrangement for producing a plurality of duplicate traces representative of a single variable signal, it will be understood that such duplicate traces may also be produced in other ways. It is therefore to be understood that the invention may be used in many other ways and may be embodied in many other forms within the scope of the appended claims.

The invention claimed is:

1. In a multiple element oscillograph in which a strip of recording material is moved in a longitudinal direction past a recording line means including, a multiple light source unit and a plurality of light-deflecting galvanometer elements for projecting light from said source unit to said recording line along a set of neighboring paths, whereby a set of spots of light are produced at said recording line by said each galvanometer element, each said set of spots of light moving in unison transverse to said longitudinal direction as said each galvanometer element is deflected, the spacing between the spots of each set being small compared with the spacing between said neighboring paths, and a masking means for confining the projection of light by each galvanometer element to a separate track on said recording strip whereby each galvanometer element produces a plurality of parallel nested oscillographic traces representative of the same signal only within the limits of a corresponding track on said recording strip.

2. In a multiple element oscillograph in which a strip of recording material is moved in a longitudinal direction past a recording line, means including a multiple light source unit and a plurality of light-deflecting galvanometer elements arranged in side-by-side relationship for projecting light from said source unit to said recording line along a separate set of neighboring coplanar paths, whereby a set of spots of light are produced at said recording line by said each galvanometer element, the light spots of each said set moving in unison transverse to said longitudinal direction as said each galvanometer element is deflected, the spacing between the spots of each set being small compared with the spacing between said neighboring paths, and channelizing means including wall members located between said galvanometer elements and said recording line for confining the projection of light by each galvanometer element to a separate track on said recording strip whereby each galvanometer element produces a plurality of parallel nested oscillographic traces representative of the same signal only within the limits of a corresponding track on said recording strip.

3. In a multiple element oscillograph in which a strip of recording material is moved in a longitudinal direction past a recording line, means including a multiple light source unit and a plurality of light-deflecting galvanometer elements arrange in side-by-side relationship for projecting light from said source unit to said recording line along a separate set of neighboring coplanar paths, whereby a set of spots of light are produced at said recording line by said each galvanometer element, the light spots of each said set moving in unison transverse to said longitudinal direction as said each galvanometer element is deflected, the spacing between the spots of each set being small compared with the spacing between said neighboring paths, and channelizing means including wall members located between said galvanometer elements and said recording line and masking means located at the end of said channelizing means near said recording line for confining the projection of light by each galvanometer element to a separate track on said recording strip whereby each galvanometer element produces a plurality of parallel nested oscillographic traces representative of the same signal only within the limits of a corresponding track on said recording strip.

4. In a multiple element oscillograph in which a strip of recording material is moved in a longitudinal direction past a recording zone, a plurality of light sources arranged at a source position along a line transverse to said longitudinal direction, a plurality of galvanometer mirrors for reflecting light from said sources to said recording zone, each of said galvanometer mirrors being adapted to project light from said sources to said recording zone along a separate set of neighboring paths, whereby a set of spots of light are produced at said recording zone by said each galvanometer mirror, the light spots of each said set moving in unison transverse to said longitudinal direction when said each galvanometer mirror is deflected, the spacing between the spots of each set being small compared with the spacing between said neighboring paths, and channelizing means including wall members located between said galvanometer mirrors and said recording zone and masking means located at the end of said channelizing means near said recording zone for confining the projection of light by each galvanometer mirror to a separate track on said recording strip whereby each galvanometer mirror produces a plurality of parallel nested oscillographic traces representative of the same signal only within the limits of a corresponding track on said recording strip.

5. A recording oscillograph as defined in claim 4 in which said light sources are formed by a device having a plurality of slits arranged with their lengths transverse to said recording zone and spaced apart in the direction of said recording zone, together with means for projecting light through said slits toward said galvanometer mirrors.

6. A recording oscillograph as defined in claim 4 wherein said light sources are formed by a linear light emitting element extending transverse to said longitudinal direction and a screen disposed between said linear light emitting element and said mirrors and having a plurality of mutually spaced apertures therein disposed along a line transverse to said longitudinal line.

7. A recording oscillograph as defined in claim 6 in which said apertures are in the form of parallel slits disposed parallel to said longitudinal direction and comprising a cylindrical lens disposed between said linear light emitting element and said screen for causing light diverging from said linear light emitting element to converge on said screen.

References Cited in the file of this patent

UNITED STATES PATENTS

| | | |
|---|---|---|
| 1,837,979 | Mensman | Dec. 22, 1931 |
| 2,256,402 | McLeod et al. | Sept. 16, 1941 |
| 2,258,700 | Doll | Oct. 14, 1941 |
| 2,293,349 | Martin et al. | Aug. 18, 1942 |
| 2,415,880 | Hassler | Feb. 18, 1947 |
| 2,580,427 | Heiland | Jan. 1, 1952 |
| 2,604,955 | Hawkins | July 29, 1952 |
| 2,645,552 | Stevinson | July 14, 1953 |
| 2,726,131 | Skelton | Dec. 6, 1955 |

FOREIGN PATENTS

| | | |
|---|---|---|
| 393,610 | Great Britain | June 1, 1933 |